(12) United States Patent
Chen

(10) Patent No.: US 8,132,478 B2
(45) Date of Patent: Mar. 13, 2012

(54) MOTION GUIDE APPARATUS

(75) Inventor: Yan Yu Chen, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 256 days.

(21) Appl. No.: 12/653,260

(22) Filed: Dec. 10, 2009

(65) Prior Publication Data

US 2011/0138950 A1 Jun. 16, 2011

(51) Int. Cl.
*F16H 1/24* (2006.01)
*F16H 1/20* (2006.01)

(52) U.S. Cl. ............... 74/424.86; 74/424.82; 74/424.88

(58) Field of Classification Search ............... 74/424.81, 74/424.82, 424.86, 424.87, 424.88, 424.9; 384/43, 45

See application file for complete search history.

(56) References Cited

U.S. PATENT DOCUMENTS

| 6,089,117 | A | 7/2000 | Ebina et al. |
| 6,286,383 | B1 | 9/2001 | Shirai et al. |
| 6,499,374 | B1 * | 12/2002 | Ohga ...................... 74/424.82 |

* cited by examiner

*Primary Examiner* — Justin Krause
(74) *Attorney, Agent, or Firm* — Charles E. Baxley

(57) ABSTRACT

A motion guide device includes a ball nut attached onto a shaft and having helical grooves for receiving ball bearing elements, and a ball coupler including a flexible coupling member having a number of openings formed between spacers for receiving ball bearing elements, the ball bearing element is contacted with the ball nut at a contact point which is spaced from the inner peripheral surface of the ball nut for a spacing distance, and the ball bearing element is contacted with the screw shaft at a contact point which is spaced from the outer peripheral surface of the screw shaft for a spacing distance that is preferably smaller than the spacing distance between the contact point of the ball bearing element and the ball nut.

5 Claims, 5 Drawing Sheets

MOTION GUIDE APPARATUS

BACKGROUND OF THE INVENTION

1. Field of the Invention

The present invention relates to a motion guide apparatus, such as a linear motion guide apparatus or a ball screw device, and more particularly to a motion guide apparatus including two movable members or a screw shaft and a ball nut movable relative to each other, and a ball circulating device attached to one of the two movable members for suitably circulating and guiding the ball bearing elements to move through an endless ball guiding passage in the ball screw device or between the two movable members.

2. Description of the Prior Art

Typical motion guide apparatuses, such as the linear motion guide apparatuses or the ball screw devices comprise two movable members rotatable or movable relative to each other, and a number of ball bearing elements disposed between the two movable members for facilitating the sliding movement between the two movable members, and one or more ball circulating elements attached to the ball nut and communicative with the helical groove portions of the screw shaft and the ball nut for forming an endless ball guiding passage in the ball screw device or between the two movable members and for slidably receiving a number of ball bearing elements.

For example, U.S. Pat. No. 6,089,117 to Ebina et al., and U.S. Pat. No. 6,286,383 to Shirai et al. disclose two of the typical ball screw devices each comprising a ball nut pivotally or rotatably coupled onto a screw shaft, and a helically running threaded channel provided between the screw shaft and the ball nut for receiving a number of loaded ball bearing elements and for facilitating the sliding movement between the screw shaft and the ball nut, and one or more ball circulating elements attached to the ball nut and communicative with the helical groove portions of the screw shaft and the ball nut for forming the endless helically running threaded channel in the ball screw device or between the screw shaft and the ball nut.

For suitably or smoothly guiding or circulating the ball bearing elements through the ball circulating channels in the tubular circulating elements, the tubular circulating elements each include four guide grooves formed through the length of each of the tubular circulating elements and communicative with the returning channels of the tubular circulating elements respectively for receiving or engaging with the flexible coupling members of the ball couplers that hold or support the ball bearing elements.

However, normally, the flexible coupling members of the ball couplers are snugly fitted and received or engaged with or between the gaps that are formed between the screw shaft and the ball nut and will be snugly contacted with the screw shaft and the ball nut such that the flexible coupling members of the ball couplers may be twisted by the screw shaft and the ball nut and such that the ball bearing elements may not be suitably guided to move through the ball running channel of the typical ball screw devices, particularly when the ball bearing elements and the flexible coupling members of the ball couplers are moved in a fast speed through the endless helically running threaded channel in the ball screw device or between the screw shaft and the ball nut.

The present invention has arisen to mitigate and/or obviate the afore-described disadvantages of the conventional motion guide apparatuses or ball screw devices.

SUMMARY OF THE INVENTION

The primary objective of the present invention is to provide a motion guide apparatus including two movable members movable relative to each other, and a ball circulating device attached to one of the two movable members or a screw shaft and a ball nut for suitably guiding and circulating the ball bearing elements to move through an endless ball guiding passage in the ball screw device or between the two movable members.

In accordance with one aspect of the invention, there is provided a motion guide apparatus comprising an elongated shaft including a helical groove formed on an outer peripheral surface thereof, a ball nut movably attached onto the elongated shaft, and including a bore formed therein and defined by an inner peripheral surface for receiving the elongated shaft, and including a helical groove formed in the inner peripheral surface thereof, a ball circulating device attached to the ball nut for forming an endless ball guiding passage between the ball nut and the elongated shaft, a number of ball bearing elements received and engaged with the endless ball guiding passage, and a ball coupler including a flexible coupling member having a number of openings formed between spacers for receiving and engaging with the ball bearing elements, and wherein the ball bearing element is contacted with the ball nut at a contact point which is spaced from the inner peripheral surface of the ball nut for a spacing distance "C1", and the ball bearing element is contacted with the screw shaft at a contact point which is spaced from the outer peripheral surface of the screw shaft for a spacing distance "C2", and the spacing distance "C2" between the contact point of the ball bearing element and the screw shaft is smaller than the spacing distance "C1" between the contact point of the ball bearing element and the ball nut.

The ball bearing elements each include a center, and a spacing distance between the center of the ball bearing element and the inner peripheral surface of the ball nut is smaller than a spacing distance between the center of the ball bearing element and the outer peripheral surface of the screw shaft for spacing the flexible coupling member of the ball coupler from the screw shaft and the ball nut.

The screw shaft includes an outer diameter "OD" calculated and determined with the following equation:

$$OD = \left( \sqrt{\left(\frac{PCD}{2}\right)^2 - \left(\frac{BD+s}{2}\right)^2} - \frac{K}{2} - T \right) \times 2$$

where "PCD" is a pitch diameter of a circle where centers of the ball bearing elements are located, "BD" is an outer diameter of the ball bearing elements 80 is indicated with, the outer diameter "OD" of the screw shaft, a thickness of the flexible coupling member is "K", "T" is a spacing distance between the flexible coupling member and the outer peripheral surface of the screw shaft, and "s" is a spacing distance between the ball bearing elements.

The helical grooves of the screw shaft and the ball nut are formed into different shapes, or formed into different contours or types for determining the spacing distance between the center of the ball bearing element and the inner peripheral surface of the ball nut and the spacing distance between the center of the ball bearing element and the outer peripheral surface of the screw shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
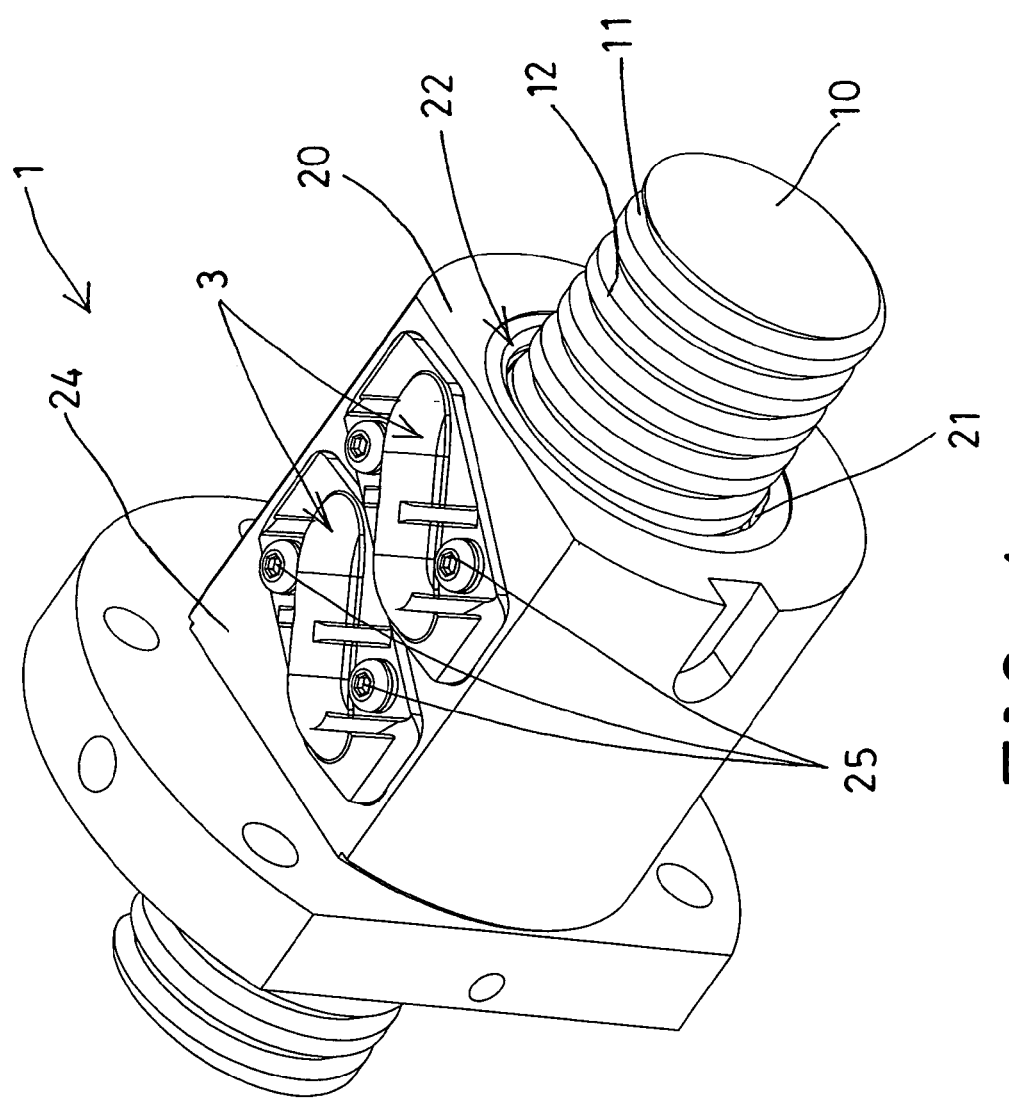
FIG. 1 is a partial perspective view of a motion guide apparatus in accordance with the present invention.

Referring to the drawings, and initially to FIGS. 1-4, a motion guide apparatus 1 in accordance with the present invention, such as a ball screw device 1, comprises an elongated bolt or screw shaft 10 including a number of helical threaded portions or grooves 11 formed on the outer peripheral portion thereof, or formed in the outer peripheral surface 12 thereof, and a movable member, such as a ball nut 20 including a screw hole or bore 21 formed therein for receiving or engaging with the elongated screw shaft 10, and the screw hole or bore 21 of the ball nut 20 is formed or defined by a number of helical threaded portions or grooves 22 and an inner peripheral surface 23 for threading or engaging or aligning with the helical threaded portions or grooves 11 of the screw shaft 10, and for forming one or more endless multiple-turn, helical raceways or ball guiding passages 8 (FIG. 2) between the screw shaft 10 and the ball nut 20, and for slidably receiving a number of ball bearing elements 80 and for facilitating the sliding or rotational movement between the two movable members 10, 20 or the screw shaft 10 and the ball nut 20.

The ball nut 20 includes a cut off portion or a flat surface 24 formed in the outer peripheral portion thereof (FIG. 1), and includes two or more orifices formed therein (not shown) and intersecting or communicating with the cut off portion or flat surface 24 of the ball nut 20, and also intersecting or communicating with the ball guiding passages 8 or the helical threaded portions or grooves 11, 22 of the screw shaft 10 and the ball nut 20 for receiving or engaging with the ball circulating devices 3 which are engaged with or attached or mounted or secured to the ball nut 20 with latches or fasteners 25 (FIG. 1) for guiding or circulating or returning the ball bearing elements 80 to move cyclically in the endless multiple-turn, helical raceway or ball guiding passage 8 of the ball screw device 1.

Figure 2:
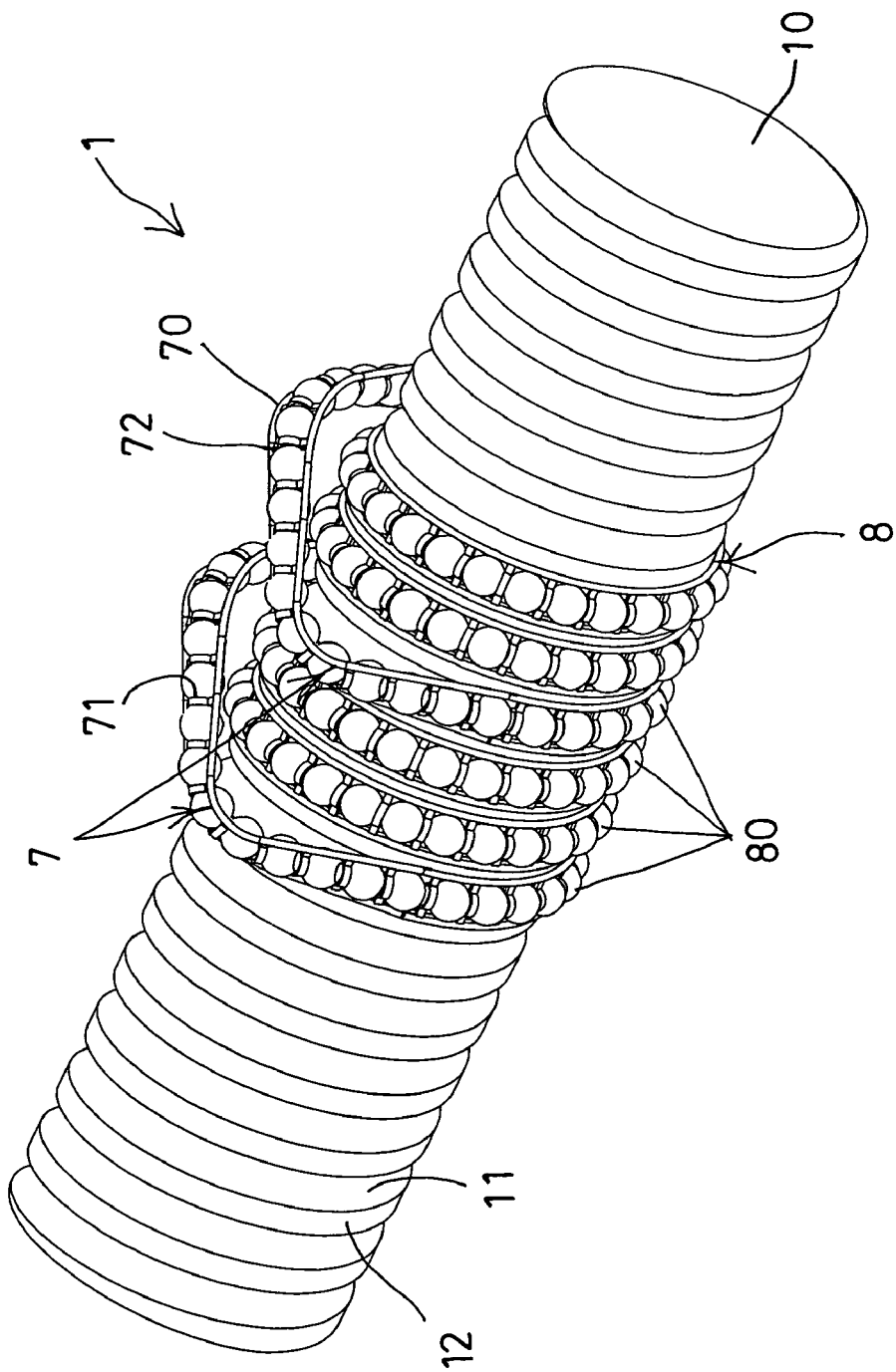
FIG. 2 is another partial perspective view of the motion guide apparatus, in which the outer ball nut has been removed for showing the structure of the screw shaft and the flexible coupling members of the ball couplers.
Figure 3:
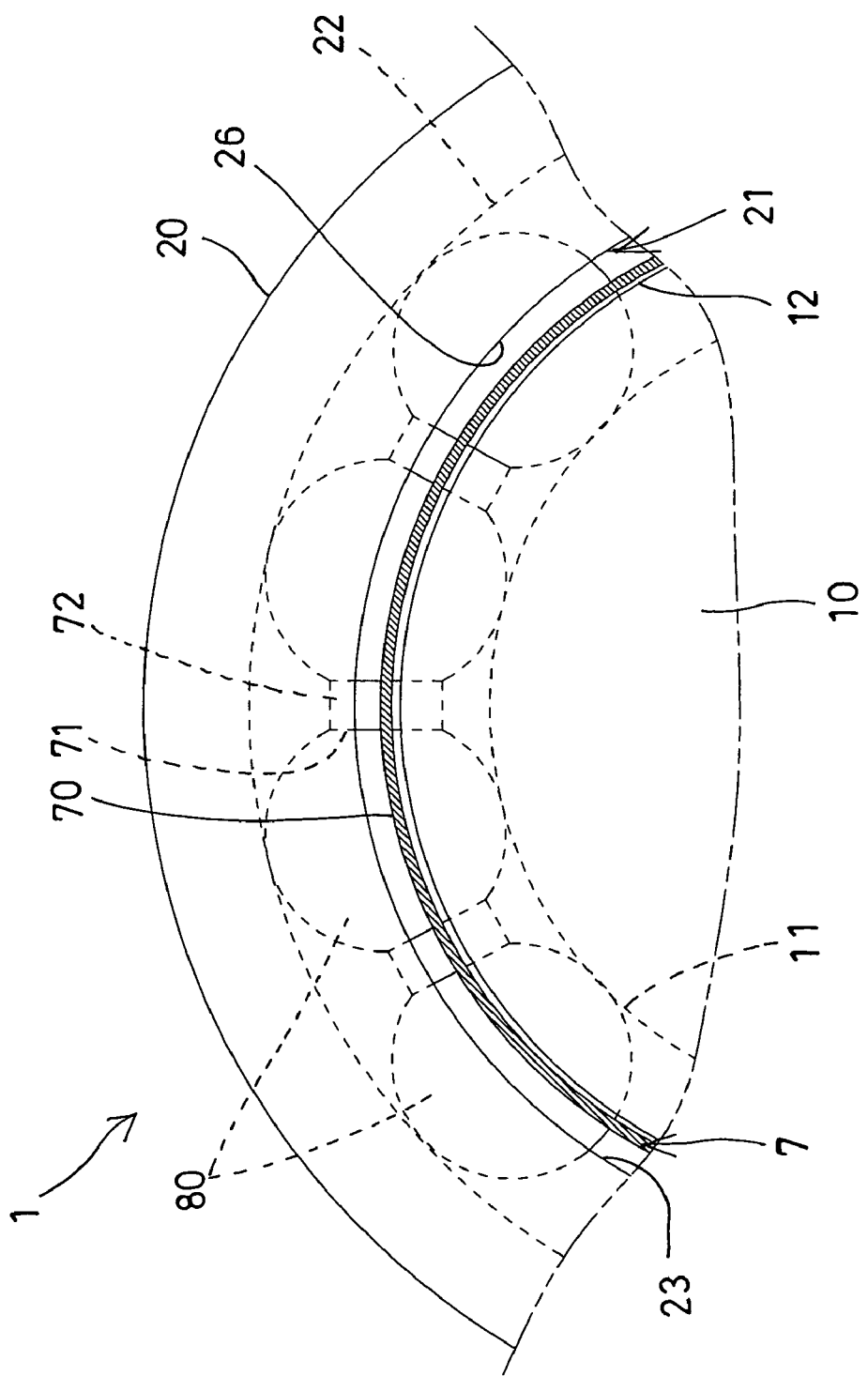
FIG. 3 is an enlarged partial end plan schematic view of the motion guide apparatus.
Figure 4:
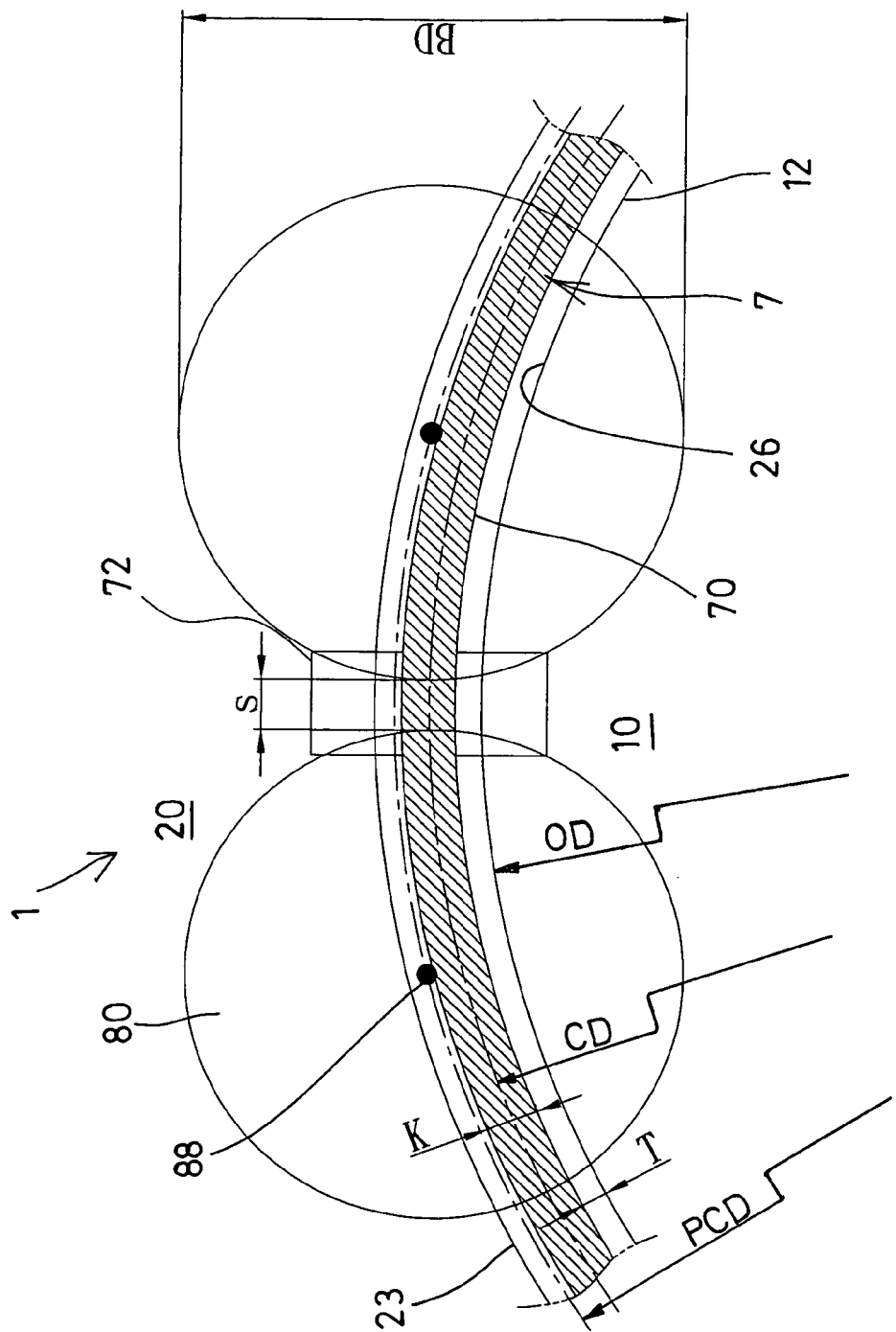
FIG. 4 is a further enlarged partial end plan schematic view of the motion guide apparatus.

As also shown in FIGS. 2-4, the motion guide apparatus 1 further includes one or more ball couplers 7 each having a flexible coupling member 70 and each having a number of openings 71 formed in the flexible coupling member 70 or formed between spacers 72 for receiving or attaching or holding or supporting or engaging with the ball bearing elements 80 and for stably anchoring and positioning the ball bearing elements 80 between the screw shaft 10 and the ball nut 20 or in the endless multiple-turn, helical raceway or ball guiding passage 8 of the ball screw device 1 and for spacing the ball bearing elements 80 from each other for a spacing distance "s" (FIG. 4), and for facilitating the sliding movement between the screw shaft 10 and the ball nut 20. The above-described structure is typical and will not be described in further details.

As also shown in FIG. 4, the ball bearing elements 80 include a center 88 located or arranged in a circle having a pitch diameter indicated with "PCD", the outer diameter "BD" of the ball bearing elements 80 is indicated with "BD", the outer diameter "OD" of the screw shaft 10 is indicated with "OD", and the thickness of the flexible coupling member 70 is indicated with "K", and the spacing distance "T" between the flexible coupling member 70 and the outer peripheral surface 12 of the screw shaft 10 is indicated with "T", and the center diameter "CD" of the gap 26 that is formed or defined between the screw shaft 10 and the ball nut 20 is indicated with "CD".

Figure 5:
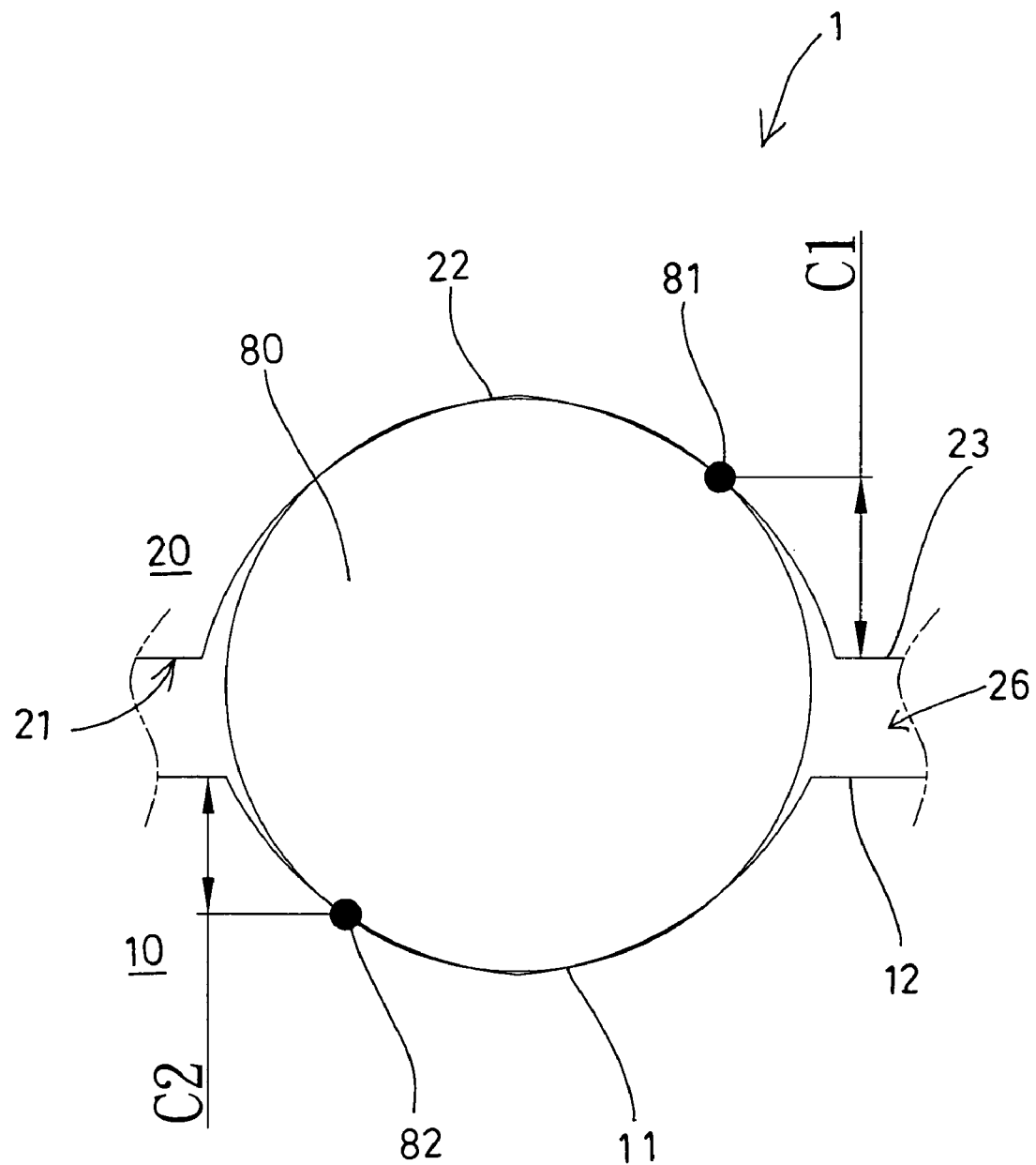
FIG. 5 is a still further enlarged partial end plan schematic view of the motion guide apparatus.

As shown in FIG. 5, for example, the ball bearing element 80 is contacted with the ball nut 20 at a contact point 81 which is spaced from the inner peripheral surface 23 of the ball nut 20 for a spacing distance "C1", and the ball bearing element 80 is contacted with the screw shaft 10 at a contact point 82 which is spaced from the outer peripheral surface 12 of the screw shaft 10 for a spacing distance "C2". The present invention is determine that the spacing distance "C2" between the contact point 82 of the ball bearing element 80 and the screw shaft 10 is smaller than the spacing distance "C1" between the contact point 81 of the ball bearing element 80 and the ball nut 20.

Or, as shown in FIGS. 3 and 4, the spacing distance between the center 88 of the ball bearing element 80 and the inner peripheral surface 23 of the ball nut 20 is preferably smaller than the spacing distance between the center 88 of the ball bearing element 80 and the outer peripheral surface 12 of the screw shaft 10, and arranged for allowing the flexible coupling member 70 of the ball coupler 7 to be suitably spaced from the screw shaft 10 and the ball nut 20 and for preventing the flexible coupling member 70 of the ball coupler 7 from being contacted and rubbed or scraped twisted or distorted by the screw shaft 10 and/or the ball nut 20.

In order to control or determine that the spacing distance "C2" between the contact point 82 of the ball bearing element 80 and the screw shaft 10 is smaller than the spacing distance "C1" between the contact point 81 of the ball bearing element 80 and the ball nut 20, the helical threaded portions or grooves 11, 22 of the screw shaft 10 and the ball nut 20 are machined and formed into different types or shapes or contours and arranged for allowing the contact points 81, 82 between the ball bearing element 80 and the ball nut 20 and the screw shaft 10 to be suitably determined.

Or, the outer diameter "OD" of the screw shaft 10 may be calculated and determined with the following equation:

$$OD = \left( \sqrt{\left(\frac{PCD}{2}\right)^2 - \left(\frac{BD+s}{2}\right)^2} - \frac{K}{2} - T \right) \times 2$$

The outer diameter "OD" of the screw shaft 10 thus calculated and determined may have the flexible coupling member 70 of the ball coupler 7 suitably received and supported and engaged in the gap 26 that is formed or defined between the screw shaft 10 and the ball nut 20, and suitably spaced from the outer peripheral surface 12 of the screw shaft 10 and the inner peripheral surface 23 of the ball nut 20, and may prevent the flexible coupling member 70 of the ball coupler 7 from being contacted and rubbed or scraped twisted or distorted by the screw shaft 10 and/or the ball nut 20.

Accordingly, the motion guide apparatus in accordance with the present invention includes two movable members movable relative to each other, and a ball circulating device attached to one of the two movable members or a screw shaft and a ball nut for suitably circulating and guiding the ball bearing elements to move through an endless ball guiding passage in the ball screw device or between the two movable members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A motion guide apparatus comprising:
an elongated shaft including a helical groove formed on an outer peripheral surface thereof,
a ball nut movably attached onto said elongated shaft, and including a bore formed therein and defined by an inner peripheral surface for receiving said elongated shaft, and including a helical groove formed in said inner peripheral surface thereof,
a ball circulating device attached to said ball nut for forming an endless ball guiding passage between said ball nut and said elongated shaft,
a plurality of ball bearing elements received and engaged with said endless ball guiding passage, and
a ball coupler including a flexible coupling member having a plurality of openings formed between spacers for receiving and engaging with said ball bearing elements, and
wherein said ball bearing element is contacted with said ball nut at a contact point which is spaced from said inner peripheral surface of said ball nut for a spacing distance (C1), and said ball bearing element is contacted with said screw shaft at a contact point which is spaced from said outer peripheral surface of said screw shaft for a spacing distance (C2), and said spacing distance (C2) between said contact point of said ball bearing element and said screw shaft is smaller than said spacing distance (C1) between said contact point of said ball bearing element and said ball nut.

2. The motion guide apparatus as claimed in claim 1, wherein said ball bearing elements each include a center, and a spacing distance between said center of said ball bearing element and said inner peripheral surface of said ball nut is smaller than a spacing distance between said center of said ball bearing element and said outer peripheral surface of said screw shaft for spacing said flexible coupling member of said ball coupler from said screw shaft and said ball nut.

3. The motion guide apparatus as claimed in claim 1, wherein said screw shaft includes an outer diameters (OD) calculated and determined with the following equation:

$$OD = \left(\sqrt{\left(\frac{PCD}{2}\right)^2 - \left(\frac{BD+s}{2}\right)^2} - \frac{K}{2} - T\right) \times 2$$

where (PCD) is a pitch diameter of a circle where centers of said ball bearing elements are located, (BD) is an outer diameter of said ball bearing elements 80 is indicated with, said outer diameter (OD) of said screw shaft, a thickness of said flexible coupling member is (K), (T) is a spacing distance between said flexible coupling member and said outer peripheral surface of said screw shaft, and (s) is a spacing distance between said ball bearing elements.

4. The motion guide apparatus as claimed in claim 1, wherein said helical grooves of said screw shaft and said ball nut are formed into different shapes.

5. The motion guide apparatus as claimed in claim 1, wherein said helical grooves of said screw shaft and said ball nut are formed into different contours.

* * * * *